United States Patent
Fan et al.

(10) Patent No.: US 12,101,156 B2
(45) Date of Patent: Sep. 24, 2024

(54) METHOD AND APPARATUS FOR MULTIPLE ANTENNA SYSTEMS

(71) Applicant: Telefonaktiebolaget LM Ericsson (publ), Stockholm (SE)

(72) Inventors: Rui Fan, Beijing (CN); Ming Li, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 491 days.

(21) Appl. No.: 17/312,605

(22) PCT Filed: Dec. 13, 2018

(86) PCT No.: PCT/CN2018/120826
§ 371 (c)(1),
(2) Date: Jun. 10, 2021

(87) PCT Pub. No.: WO2020/118600
PCT Pub. Date: Jun. 18, 2020

(65) Prior Publication Data
US 2022/0038161 A1    Feb. 3, 2022

(51) Int. Cl.
*H04B 7/06* (2006.01)
*H04B 7/0413* (2017.01)
(Continued)

(52) U.S. Cl.
CPC ......... *H04B 7/0691* (2013.01); *H04B 7/0413* (2013.01); *H04L 5/0048* (2013.01); *H04W 24/10* (2013.01); *H04W 52/0206* (2013.01)

(58) Field of Classification Search
CPC .......... H04B 1/1615; H04B 7/02; H04B 7/04; H04B 7/06; H04B 7/0686; H04B 7/0691;
(Continued)

(56) References Cited

U.S. PATENT DOCUMENTS

2007/0058603 A1    3/2007    Song et al.
2008/0232325 A1    9/2008    Mehta et al.
(Continued)

FOREIGN PATENT DOCUMENTS

CN    101730979 A    6/2010
CN    102404689 A    4/2012
(Continued)

OTHER PUBLICATIONS

Extended European Search Report for EP Patent Application No. 18943157.0, mailed Jun. 20, 2022, 15 pages.
(Continued)

*Primary Examiner* — Matthew W Genack
(74) *Attorney, Agent, or Firm* — Sonoda & Kobayashi Intellectual Property Law; Sarvajit S. Patil

(57) ABSTRACT

Embodiments of the present disclosure provide methods and apparatuses for multiple antenna systems. A method implemented at a network device may include: transmitting at least one reference signal to at least one user equipment by using at least one muting sequence of an antenna array; receiving measurement results of the at least one reference signal corresponding to the at least one muting sequence from the at least one user equipment; selecting one muting sequence from the at least one muting sequence based on the measurement results; and applying the selected muting sequence of the antenna array.

19 Claims, 13 Drawing Sheets

(51) Int. Cl.
  *H04L 5/00* (2006.01)
  *H04W 24/10* (2009.01)
  *H04W 52/02* (2009.01)
(58) Field of Classification Search
  CPC ....... H04B 7/084; H04L 5/003; H04L 5/0048; H04L 5/005; H04L 5/0051; H04W 24/00; H04W 24/10; H04W 52/00; H04W 52/02; H04W 52/0203; H04W 52/0206
  See application file for complete search history.

(56) References Cited

U.S. PATENT DOCUMENTS

| | | | |
|---|---|---|---|
| 2012/0315948 A1 | 12/2012 | Frenger et al. | |
| 2014/0179235 A1 | 6/2014 | Huang | |
| 2015/0365790 A1* | 12/2015 | Edge | H04W 76/50 455/456.1 |
| 2016/0028448 A1* | 1/2016 | Park | H04B 7/26 375/267 |
| 2016/0080106 A1* | 3/2016 | Srinivasan | H04W 64/00 455/1 |
| 2017/0318491 A1* | 11/2017 | Chen | H04B 7/0617 |
| 2018/0241486 A1* | 8/2018 | Heo | H04B 17/318 |

FOREIGN PATENT DOCUMENTS

| | | | | |
|---|---|---|---|---|
| CN | 102771165 A | 11/2012 | | |
| CN | 103889036 A | 6/2014 | | |
| EP | 2847907 A1 | 3/2015 | | |
| WO | WO-2012041393 A1 * | 4/2012 | ............ | H04W 16/14 |
| WO | 2017129225 A1 | 8/2017 | | |

OTHER PUBLICATIONS

3GPP TSG RAN1 #66, "Coordinated Scheduling (CS) Schemes with Low Power RRH" Details and Phase-2 Evaluations Results Motorola Mobility, 6.5.1, R1-112441, Athens, Greece, Aug. 22-26, 2011, 8 pages.

3GPP TSG RAN WG1 #43, "Transmit Antenna Selection Techniques for Uplink E-UTRA" Institute for Infocomm Research (I2R), Mitsubishi Electric, NTT DoComo, 8.5, R1-051398, Seoul, South Korea, Nov. 7-11, 2005, 7 pages.

International Search Report and Written Opinion of the International Searching Authority, PCT/CN2018/120826, mailed Sep. 18, 2019, 8 pages.

* cited by examiner

600

602
Transmitting configuration information of the at least one reference signal to the at least one user equipment

604
Transmitting at least one reference signal to at least one user equipment by using at least one muting sequence of an antenna array

606
Receiving measurement results of the at least one reference signal corresponding to the at least one muting sequence from the at least one user equipment

608
Selecting one muting sequence from the at least one muting sequence based on the measurement results

610
Applying the selected muting sequence of the antenna array

FIG. 6

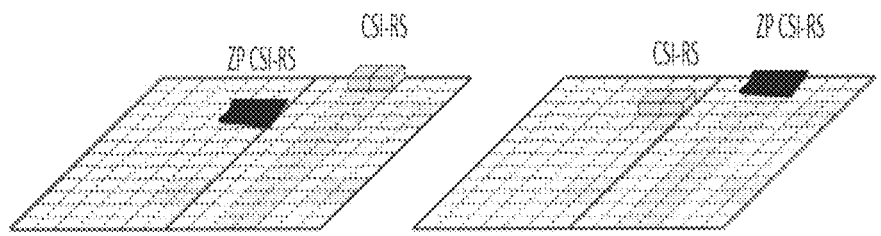

Receiving from the network device configuration information of the at least one reference signal

804

Receiving at least one reference signal transmitted from a network device by using different mute sequences of an antenna array

806

Transmitting measurement results of the at least one reference signal to the network element

METHOD AND APPARATUS FOR MULTIPLE ANTENNA SYSTEMS

CROSS REFERENCE TO RELATED APPLICATIONS

This application is a 35 U.S.C. § 371 national stage application of PCT International Application No. PCT/CN2018/120826 filed on Dec. 13, 2018, the disclosure and content of which is incorporated by reference herein in its entirety.

TECHNICAL FIELD

The non-limiting and exemplary embodiments of the present disclosure generally relate to the technical field of communications, and specifically to methods and apparatuses for multiple antenna systems.

BACKGROUND

This section introduces aspects that may facilitate a better understanding of the disclosure. Accordingly, the statements of this section are to be read in this light and are not to be understood as admissions about what is in the prior art or what is not in the prior art.

Some radio communications systems may use multiple antenna systems. Multiple antenna systems are typically known as Multiple Input Multiple Output systems (MIMO). MIMO sleep mode feature in a classic radio product may be to dynamically change a MIMO configuration such as 4×2 MIMO or 2×2 MIMO to another MIMO configuration such as Single Input Multiple Output (SIMO) configuration for example during low traffic load time periods in order to reduce power consumption. With the classic radio product, this may be pretty straight forward—just to switch off unused transmitter branches.

In some communication systems such as long term evolution (LTE), the mobility may be defined by a reference symbol such as Cell-specific Reference Symbol (CRS). In case of classic radio products with multiple antenna systems, each antenna branch may be configured with a specific CRS. For example, a first antenna branch may be configured with CRS0, a second antenna branch may be configured with CRS1, and so on. A user equipment (UE) may always start to listen to a predefined CRS such as CRS0, and then to the other CRSs if they exist. Therefore, when switching from a MIMO configuration such as 4×2 MIMO or 2×2 MIMO to another MIMO configuration such as SIMO, the antenna branch with the predefined CRS such as CRS0 is the one that must remain active. FIG. 1 schematically shows a MIMO sleep sequence. As shown in FIG. 1, when switching from 2×2 MIMO to SIMO, the antenna branch with CRS0 is the one that must remain active.

An LTE active antenna system (AAS) radio may use wide beams for control channels and narrow beams for data channels. For example, a half of an antenna panel/array may be used for one polarization of the wide beam while the other half of the antenna panel/array may be used for orthogonal polarization of the wide beam. All available antenna elements in columns may be used for the narrow beams for the data channels. FIG. 2 schematically shows an AAS having an 8×8 antenna array. As shown in FIG. 2, there are two CRSs, each of which occupies a half of the antenna panel/array. The left half of the antenna panel/array is used for CRS0 and the right half of the antenna panel is used for CRS1. A proposal for LTE AAS antenna sleep mode is to switch off all antenna elements used for CRS1 and to keep the antenna elements used for CRS0 unaffected. In this case, the mobility will be unaffected since the power for CRS0 will remain unchanged. Table 1 schematically shows a link budget when a column-wise mute sequence is adopted to minimize power/array gain loss for control channel

TABLE 1

|  | 1 antenna column switched-off | 2 antenna columns switched-off | 3 antenna columns switched-off |
|---|---|---|---|
| CRS1 degradation | 2.5 dB | 6.0 dB | 12.0 dB |
| Reduced link budget for control channels | <1 dB | <2 dB | <4 dB |
| Reduced link budget for data channels | 1.06 dB | 2.5 dB | 4.0 dB |

SUMMARY

In a first aspect of the disclosure, there is provided a method implemented at a network device. The method may comprise transmitting at least one reference signal to at least one user equipment by using at least one muting sequence of an antenna array. The method may further comprise receiving measurement results of the at least one reference signal corresponding to the at least one muting sequence from the at least one user equipment. The method may further comprise selecting one muting sequence from the at least one muting sequence based on the measurement results. The method may further comprise applying the selected muting sequence of the antenna array.

In a second aspect of the disclosure, there is provided a method implemented at a user equipment. The method may comprise receiving at least one reference signal transmitted from a network device by using different mute sequences of an antenna array. The method may further comprise transmitting measurement results of the at least one reference signal to the network element.

In a third aspect of the disclosure, there is provided an apparatus implemented at a network device. The apparatus may comprise a processor; and a memory coupled to the processor, said memory containing instructions executable by said processor, whereby said apparatus is operative to transmit at least one reference signal to at least one user equipment by using at least one muting sequence of an antenna array; receive measurement results of the at least one reference signal corresponding to the at least one muting sequence from the at least one user equipment; select one muting sequence from the at least one muting sequence based on the measurement results; and apply the selected muting sequence of the antenna array.

In a fourth aspect of the disclosure, there is provided an apparatus implemented at a user equipment. The apparatus may comprise a processor; and a memory coupled to the processor, said memory containing instructions executable by said processor, whereby said apparatus is operative to receive at least one reference signal transmitted from a network device by using different mute sequences of an antenna array; and transmit measurement results of the at least one reference signal to the network element.

In a fifth aspect of the disclosure, there is provided a computer program product, comprising instructions which, when executed on at least one processor, cause the at least one processor to carry out the method according to the first aspect of the disclosure.

In a sixth aspect of the disclosure, there is provided a computer program product, comprising instructions which, when executed on at least one processor, cause the at least one processor to carry out the method according to the second aspect of the disclosure.

In a seventh aspect of the disclosure, there is provided a computer-readable storage medium storing instructions which when executed by at least one processor, cause the at least one processor to carry out the method according to the first aspect of the disclosure.

In an eighth aspect of the disclosure, there is provided a computer-readable storage medium storing instructions which when executed by at least one processor, cause the at least one processor to carry out the method according to the second aspect of the disclosure.

In a ninth aspect of the disclosure, there is provided an apparatus implemented at a network device. The apparatus may comprise a first transmitting unit configured to transmit at least one reference signal to at least one user equipment by using at least one muting sequence of an antenna array; a receiving unit configured to receive measurement results of the at least one reference signal corresponding to the at least one muting sequence from the at least one user equipment; a selecting unit configured to select one muting sequence from the at least one muting sequence based on the measurement results; and an applying unit configured to apply the selected muting sequence of the antenna array.

In a tenth aspect of the disclosure, there is provided an apparatus implemented at a user equipment. The apparatus may comprise a first receiving unit configured to receive at least one reference signal transmitted from a network device by using different mute sequences of an antenna array; and a transmitting unit configured to transmit measurement results of the at least one reference signal to the network element.

In an eleventh aspect of the disclosure, there is provided a communication system. The communication system may comprise a host computer comprising a processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of the method according to the first aspect of the disclosure.

In an twelfth aspect of the disclosure, there is provided a method implemented in a communication system including a host computer, a base station and a user equipment (UE). The method may comprise at the host computer, providing user data; and at the host computer, initiating a transmission carrying the user data to the UE via a cellular network comprising the base station, wherein the base station performs any of the steps of the method according to the first aspect of the disclosure.

In an thirteenth aspect of the disclosure, there is provided a communication system. The communication system may comprise a host computer comprising processing circuitry configured to provide user data; and a communication interface configured to forward user data to a cellular network for transmission to a user equipment (UE), wherein the UE comprises a radio interface and processing circuitry, the UE's components configured to perform any of the steps of the method according to the second aspect of the disclosure.

In an fourteenth aspect of the disclosure, there is provided a method implemented in a communication system. The communication system may comprise a host computer, a base station and a user equipment (UE). The method may comprise at the host computer, providing user data; and at the host computer, initiating a transmission carrying the user data to the UE via a cellular network comprising the base station, wherein the UE performs any of the steps of the method according to the second aspect of the disclosure.

Some embodiments of the disclosure can determine antenna elements switching off approach based on not only coverage but also system capacity and power saving effect. Some embodiments of the disclosure can determine antenna elements switching off approach based on not only signal power level but also interference. Some embodiments of the disclosure introduce UE feedback assisted cell quality, e.g. SINR, evaluation when deciding antenna elements switching off approaches, which can more reflect real network situations.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 6 shows a flowchart of a method according to an embodiment of the present disclosure;

FIG. 7a schematically shows an example of CSI-RS and CSI-IM.

DETAILED DESCRIPTION

Figure 1:
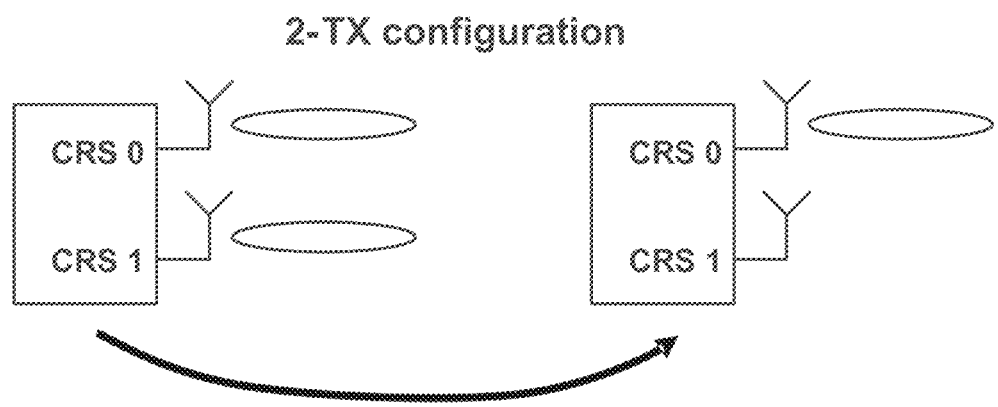
FIG. 1 schematically shows a MIMO sleep sequence.
Figure 2:
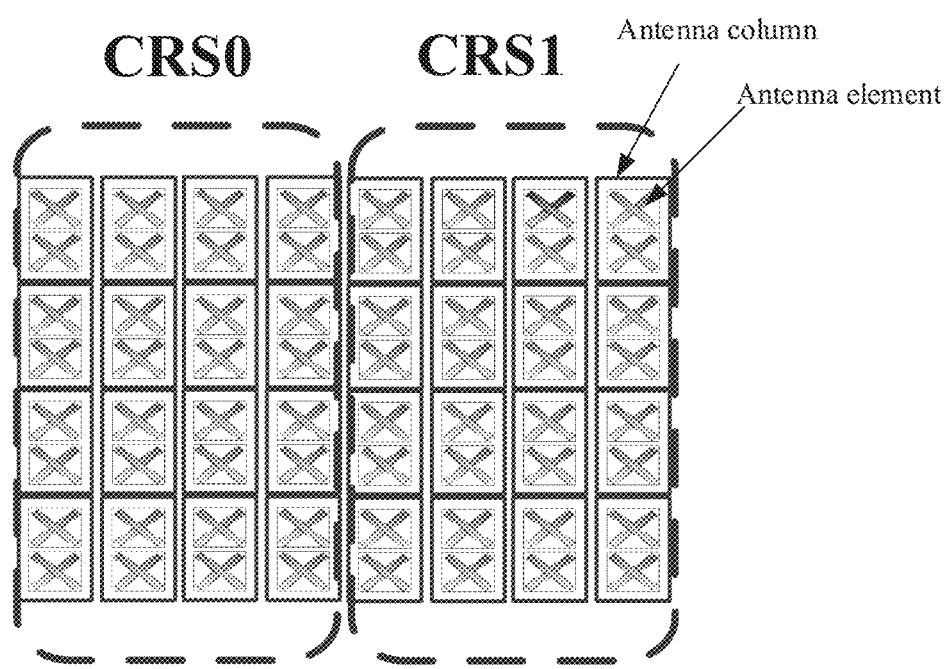
FIG. 2 schematically shows an active antenna system having an 8×8 antenna array.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "communication network" refers to a network following any suitable communication standards, such as new radio (NR), long term evolution (LTE), LTE-Advanced (LTE-A), wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), an integrated access backhaul (IAB) node, a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another specific example, in an IoT scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device to a terminal device, and an uplink, UL, transmission refers to a transmission in an opposite direction.

Figure 3:
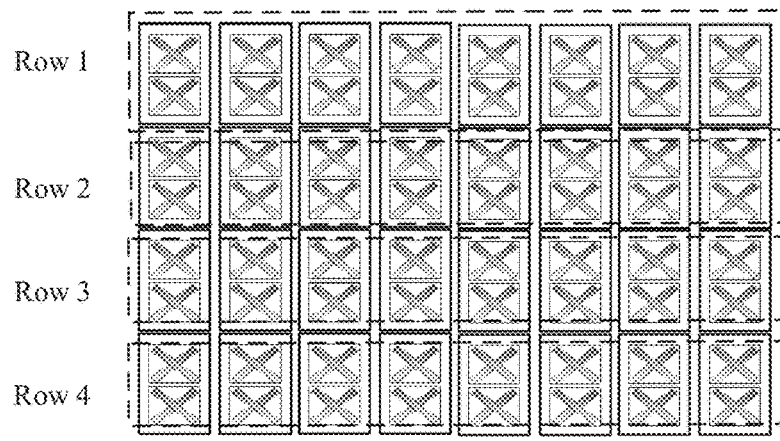
FIG. 3 schematically shows an example of a row-wise muting sequence.

As used herein, a row-wise muting sequence refers to switching off antenna elements in a row in an order of a row. FIG. 3 schematically shows an example of a row-wise muting sequence. As shown in FIG. 3, the antenna array may comprise four rows of antenna elements, i.e., rows 1-4. In an embodiment, the network device may switch off the antenna elements in rows 1-4 in turn or in a predefined order. For example, the predefined order may be {row 4, row 3, row 2, row 1} or any other suitable order. In another embodiment, the network device may switch off the antenna elements in a part of rows 1-4 in turn or in a predefined order. For example, the antenna elements in some rows such as rows 2-3 may not be switched off and the antenna elements in one or more specified rows such as rows 1 and 4 may be switched off. It is noted that a width of a row (i.e., how many antenna elements belong to a row) can be determined based on various factors such as antenna design, antenna configuration, application scenario, manual configuration, etc.

Figure 4:
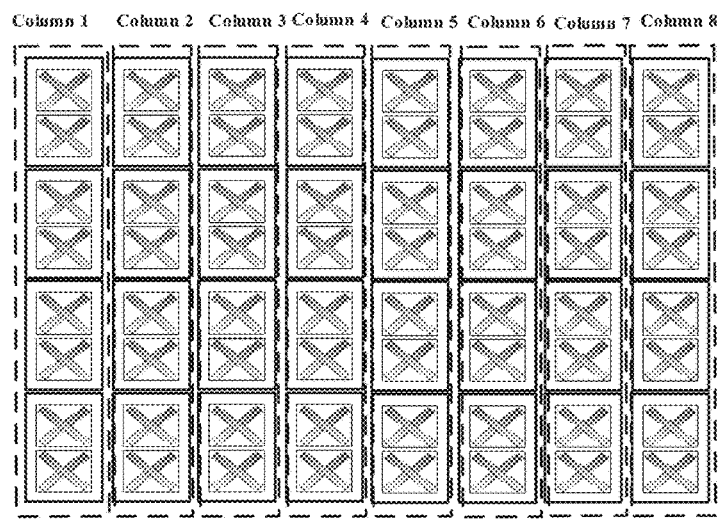
FIG. 4 schematically shows an example of a column-wise muting sequence.

As used herein, a column-wise muting sequence refers to switching off antenna elements in a column in an order of a column. FIG. 4 schematically shows an example of a column-wise muting sequence. As shown in FIG. 4, the antenna array may comprise eight columns of antenna elements, i.e., columns 1-8. In an embodiment, the network device may switch off the antenna elements in columns 1-8 in turn or in a predefined order. For example, the predefined order may be {column 8, column 7, column 6, column 5, column 4, column 3, column 2, column 1} or any other suitable order. In another embodiment, the network device may switch off the antenna elements in a part of columns 1-8 in turn or in a predefined order. For example, the antenna elements in some columns such as columns 2-7 may not be switched off and the antenna elements in one or more specified columns such as columns 1 and 8 may be switched off. It is noted that a width of a column (i.e., how many antenna elements belong to a column) can be determined based on various factors such as antenna design, antenna configuration, application scenario, manual configuration, etc.

Figure 5:
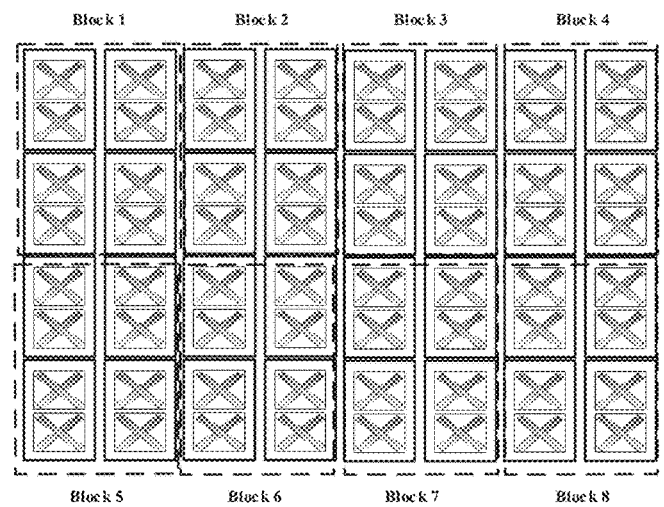
FIG. 5 schematically shows an example of a block-wise muting sequence.

As used herein, a block-wise muting sequence refers to switching off antenna elements in a block in an order of a block. FIG. 5 schematically shows an example of a block-wise muting sequence. As shown in FIG. 5, the antenna array may comprise eight blocks of antenna elements, i.e., blocks 1-8. In an embodiment, the network device may switch off the antenna elements in blocks 1-8 in turn or in a predefined order. For example, the predefined order may be {block 8, block 7, block 6, block 5, block 4, block 3, block 2, block 1} or any other suitable order. In another embodiment, the network device may switch off the antenna elements in a part of blocks 1-8 in turn or in a predefined order. For example, the antenna elements in some blocks may not be switched off and the antenna elements in one or more specified blocks may be switched off. It is noted that a size of a block (i.e., how many antenna elements belong to a block) can be determined based on various factors such as antenna design and antenna configuration, application scenario, manual configuration, etc. For example, the antenna elements sharing a same transmitter circuit may be defined as a block.

In the following description and claims, unless defined otherwise, all technical and scientific terms used herein have the same meaning as commonly understood by one of ordinary skills in the art to which this disclosure belongs.

There are some drawbacks of a current MIMO sleep mode of the LTE AAS. For example, the antenna elements switching off order is always the column-wise muting sequence, which is depending on an assumed scenario, e.g., vertical beamforming preferred. However, the column-wise muting sequence may be not enough, since a real scenario may be too complex to be categorized into this typical user case, e.g., the vertical beamforming preferred. For example, rural and urban scenarios may introduce more complexity. In addition, minimizing power/array gain loss to keep coverage is an only criterion to determine an antenna elements switching off approach in the LTE AAS. However from a whole system perspective, it may be not enough to just consider power changes when the antenna elements are switched off. Beam pattern may change when a different number of antenna elements are switched off. This means that a cell edge may suffer a different level of inter-cell interference. In other words, the interference impact isn't considered in the current MIMO sleep mode of the LTE AAS. Moreover, an antenna elements sleep impact on throughput and power saving effect is not considered in the current MIMO sleep mode of the LTE AAS. There may be the cases that different antenna elements switching off approaches can keep the same coverage by using a power boosting approach but with different cell capacity and power saving effect. In addition to the column-wise muting sequence used in the current MIMO sleep mode of the LTE AAS, there may be any other suitable antenna elements switching off approaches, for example a row-wise muting sequence and a block-wise muting sequence, which may achieve a better power saving effect than the column-wise muting sequence. In other wireless communication systems with the multiple antenna system, there may be other factors that should be considered in the MIMO sleep mode. For example, a flexible NR feature may be utilized in the MIMO sleep mode.

To overcome or mitigate at least one of the above mentioned problems or other problems or provide a useful solution, the embodiments of the present disclosure propose a new solution for MIMO sleep mode. Some embodiments of the present disclosure may determine an antenna elements muting sequence based on a UE feedback. Some embodiments of the present disclosure may enable the network device to try different antenna switching off approaches in a temporary period and collect CSI (Channel State Information) feedback from UEs in a cell in that period. Some embodiments of the present disclosure may enable the network device to translate UE CSI feedback into a metric to represent cell quality, e.g. Cumulative Distribution Function (CDF) of Signal to Interference plus Noise Ratio (SINR) in a cell. Some embodiments of the present disclosure may enable the network device to select an antenna switching off approach which can give a best effect for the cell.

Many advantages may be achieved by applying the proposed solution according to the present disclosure. For example, in some embodiment, not only coverage but also system capacity and power saving effect are considered to determine the antenna elements switching off approach. In some embodiment, not only the signal power level but also the interference is considered to determine the antenna elements switching off approach. In addition, multiple muting sequences such as a row-wise muting sequence, a column-wise muting sequence and a block-wise muting sequence are utilized to determine the antenna elements switching off approach.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

FIG. 6 shows a flowchart of a method 600 according to an embodiment of the present disclosure. The method 600 illustrated in FIG. 6 may be performed by an apparatus implemented in a network device or communicatively coupled to a network device. As such, the network device may provide means for accomplishing various parts of the method 600 as well as means for accomplishing other processes in conjunction with other components.

At block 602 (optional), the network device may transmit configuration information of at least one reference signal to at least one user equipment. The configuration information of the at least one reference signal may be configured to the user equipment in a dynamic or semi-static manner by using a physical layer signaling or higher layer signaling. The configuration information may include any suitable information such as an index of reference signal configuration information, a transmission period of the reference signal, a transmission offset, reference signal resource configuration information, etc.

In an embodiment, the configuration information of the at least one reference signal may comprise the configuration information related to channel state information-interference measurement (CSI-IM) and/or the configuration information related to a channel state information-reference signal (CSI-RS). The CSI-RS and CSI-IM mechanism can get a better CSI information when different antenna elements are switched off. FIG. 7a schematically shows an example of CSI-RS and CSI-IM. Non zero power/zero power (NZP/ZP) CSI-RS resource is a set of NZP/ZP CSI-RS port(s) mapped to a set of resource elements (REs) within a frequency span/a time duration which can be measured at least to derive a CSI. Multiple NZP/ZP CSI-RS resources can be configured to a UE. For a UE, two following CSI processes may be configured.

Process 0 with resource A corresponding to NZP CSI-RS and resource B corresponding to CSI-IM, which is ZP CSI-RS at a neighbor cell or transmission point. CSI report by using this CSI process reflects the channel state when there is no transmission from the neighbor cell or transmission point.

Process 1 with resource A corresponding to ZP CSI-RS and resource B corresponding to CSI-IM, which is NZP CSI-RS at a neighbor cell or transmission point. CSI report by using this CSI process reflects the channel state when there is transmission from the neighbor cell or transmission point.

The CSI-IM resource is a resource for a terminal that receives data from one or more base station to accurately measure interference with an adjacent base station. For example, when it is desired to measure the amount of interference when the first adjacent base station transmits data and the amount of interference when the second adjacent base station transmit the data, the base station may configure a CSI-RS resource and two CSI-IM resources, the base station can effectively measure the amount of interference exerted by the adjacent base station in a manner that it makes the first adjacent base station transmit a signal on one CSI-IM resource whereas it makes the second adjacent base station transmit the signal on the other CSI-IM resource.

In another embodiment, the configuration information of the at least one reference signal can be known by the UEs in other suitable ways such as an implicit manner. In this embodiment, the configuration information of the at least one reference signal may not be transmitted to the UEs in an explicit manner. For example, the UEs may deduce the configuration information of the at least one reference signal based on any other suitable information from the network device.

At block 604, the network device may transmit the at least one reference signal to at least one user equipment by using at least one muting sequence of an antenna array. In a wireless communication system such as a cellular system, the network device such as base station may transmit a reference signal to a terminal device in order to measure a channel (such as downlink and/or uplink) state. The reference signal may be any suitable reference signal for example depending on a specific wireless communication system or application scenario. For example, the reference signal may be the Cell-specific Reference Symbol (CRS) and/or channel state information-reference signal (CSI-RS). In other wireless communication systems, there may be other reference signals. The network device may be preconfigured with at least one muting sequence of an antenna array by an operator, a manufactory, a user, etc. In addition, the at least one muting sequence of an antenna array may be different in different time periods.

In an embodiment, the at least one muting sequence may comprise at least one of a row-wise muting sequence, a column-wise muting sequence and a block-wise muting sequence. For example, the network device may transmit at least one reference signal to at least one user equipment by using the row-wise muting sequence, then the column-wise muting sequence, and finally the block-wise muting sequence.

In an embodiment, unmuted antenna elements of the antenna array may form a connectivity pattern. As shown in FIG. 3, the antenna elements in row 1 or 4 can be switched off and the unmuted antenna elements in rows 2-4 or 1-3 can form a connectivity pattern. As shown in FIG. 4, the antenna elements in column 1 or 8 can be switched off and the unmuted antenna elements in columns 2-8 or 1-7 can form a connectivity pattern. As shown in FIG. 5, the antenna elements in any one of blocks 1-8 can be switched off and the unmuted antenna elements can form a connectivity pattern. It is noted there may be any other suitable ways to switch off the antenna elements of the antenna array such that unmuted antenna elements form the connectivity pattern. In this embodiment, the antenna elements in some columns, rows and blocks may not be switched off.

When a terminal device receives the at least one reference signal from the network device, it may measure the at least one reference signal and transmit measurement results of the at least one reference signal back to the base station for example in any suitable form for example as defined in a wireless communication standard such as LTE/LTE-A/NR. The measurement results may comprise any suitable information such as signal-to-interference and noise ratio (SINR), channel quality indicator, etc.

At block 606, the network device may receive measurement results of the at least one reference signal corresponding to the at least one muting sequence from the at least one user equipment.

At block 608, the network device may select one muting sequence from the at least one muting sequence based on the measurement results. The network device may perform any suitable data processing on the measurement results corresponding to each muting sequence to obtain multiple corresponding processing results and then select one muting sequence from the at least one muting sequence based on the multiple corresponding processing results. The processing results may comprise at least one statistical value of the measurement results such as a percentile and/or mean of the measurement results. For example, the percentile of the measurement results may comprise any suitable percentiles such as 10th percentile, 50th percentile, 90th percentile, etc. In an embodiment, the measurement results may comprise a signal-to-interference and noise ratio (SINR). The network device may select the muting sequence which gives the best SINR.

In an embodiment, the coverage and system capacity may be derived from the SINR for example based on any existing approaches, and the network device may select one muting sequence from the at least one muting sequence based on the measurement results and at least one of power saving result, coverage and system capacity corresponding to the different mute sequences. The power saving result corresponding to one mute sequence may be estimated or measured. The coverage and system capacity corresponding to the different mute sequences may be derived from the measurement results such as SINR as described above. The power saving result, coverage and system capacity may be configured with respective effective conditions. For example, the power saving result may be required to meet a specified condition such as larger than some percentage of power reduction. The coverage may be required to be larger than a threshold. The system capacity may be required to support a specified number of users. When the effective condition is not satisfied, then the corresponding muting sequence may not be selected.

In an embodiment, the network device may compute respective values corresponding to the different mute sequences by using any suitable function of the measurement results and at least one of power saving result, coverage and system capacity and then select the muting sequence based on the computed values. In addition, the measurement results and the power saving result, the coverage and the system capacity may be normalized and configured with different weights when computing the values.

In an embodiment, the network device may compare the measurement results and at least one of power saving result, coverage and system capacity in a specified order. For example, the network device may first compare the measurement results such as statistical values corresponding to two candidate muting sequences, and when a difference of two statistical values corresponding to two candidate muting sequences is smaller than a predefined threshold, then the network device may further compare power saving result or coverage or system capacity. The comparing process may be performed several times until one muting sequence has been selected.

In an embodiment, when a difference of two statistical values corresponding to two muting sequences is smaller than a predefined threshold, one muting sequence capable of saving more power of the two muting sequences has a higher priority to be selected.

At block 610, the network device may apply the selected muting sequence of the antenna array.

In an embodiment, the antenna array may comprise an active antenna system.

In an embodiment, the network device may comprise a base station of a wireless communication system.

The operations of blocks 602, 604, 606, 608 and 610 may be performed periodically and/or at a specified time and/or based on an event trigger such as load status.

Figures 7B, 8:
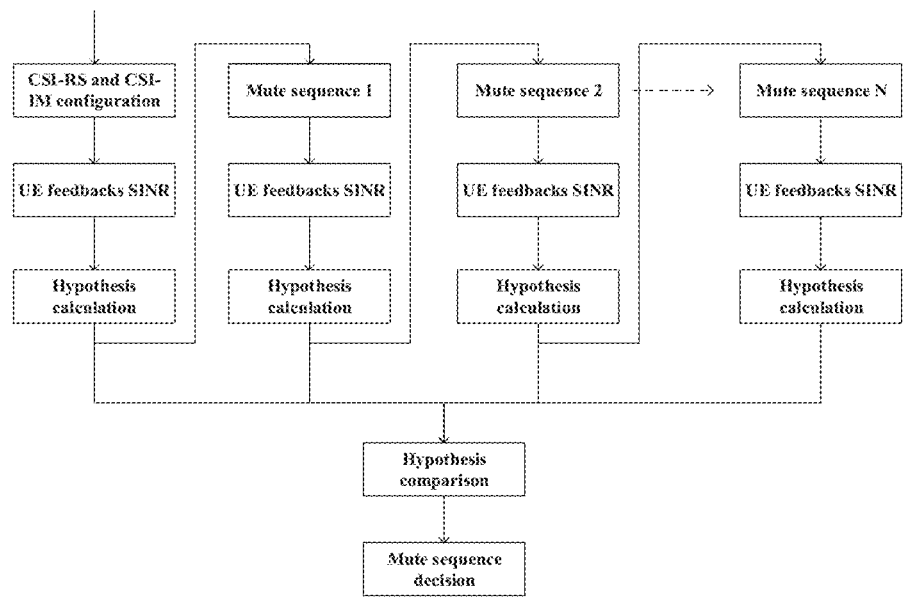
FIG. 7b shows a flowchart of a method according to another embodiment of the present disclosure.
FIG. 8 is a flow chart depicting a method according to an embodiment of the present disclosure.

FIG. 7b shows a flowchart of a method according to another embodiment of the present disclosure. The method illustrated in FIG. 7b may be performed by an apparatus implemented in a network device or communicatively coupled to a network device. As such, the network device may provide means for accomplishing various parts of the method as well as means for accomplishing other processes in conjunction with other components.

As shown in FIG. 7b, when channel state information from different UEs is gotten, overall cell quality can be derived from the channel state information. Cell quality may be estimated based on statistic results of channel state information from different UEs. Different statistic metric can be selected, e.g. mean SINR, percentile of SINR, etc. Different mute sequence of an antenna array may be tried sequentially in a temporary period and a hypothesis result corresponding to different muting sequence can be obtained. Then network device can determine a muting sequence after comparing the hypothesis results from different muting sequence. In addition, besides SINR of the cell, power saving effect can also be taken into consideration to determine which muting sequence to choose. For example, if statistic results of SINR of the cell of two muting sequence are like each other, the one which can save more power can be selected.

FIG. 8 is a flow chart depicting a method 800 according to an embodiment of the present disclosure. The method 800 illustrated in FIG. 8 may be performed by an apparatus implemented in a user equipment or communicatively coupled to a user equipment. As such, the user equipment may provide means for accomplishing various parts of the method 800 as well as means for accomplishing other processes in conjunction with other components. For some parts which have been described in the above embodiments, detailed description thereof is omitted here for brevity.

At block 802 (optional), the user equipment may receive from the network device configuration information of at least one reference signal. For example, the network device may transmit configuration information of the at least one reference signal to the at least one user equipment at block 602 of FIG. 6, then the user equipment may receive the configuration information of at least one reference signal transmitted from the network device.

In an embodiment, the configuration information of the at least one reference signal may comprise the configuration information related to channel state information-interference measurement (CSI-IM) and/or the configuration information related to a channel state information-reference signal (CSI-RS).

In an embodiment, the configuration information of the at least one reference signal can be known by the UE in other suitable ways such an implicit manner. In this embodiment, the configuration information of the at least one reference signal may not be transmitted to the UE in an explicit manner. For example, the UE may deduce the configuration information of the at least one reference signal based on any other suitable information from the network device.

At block 804, the UE may receive at least one reference signal transmitted from the network device by using different mute sequences of an antenna array. For example, the network device may transmit the at least one reference signal to at least one user equipment by using at least one muting sequence of an antenna array at block 604 of FIG. 6, then the UE may receive at the least one reference signal.

In an embodiment, the at least one muting sequence may comprise at least one of a row-wise muting sequence, a column-wise muting sequence and a block-wise muting sequence. In an embodiment, unmuted antenna elements of the antenna array form a connectivity pattern.

When the user equipment receives the at least one reference signal from the network device, it may measure the at least one reference signal and transmit measurement results of the at least one reference signal back to the base station for example in a form as defined in a wireless communication standard such as LTE/LTE-A/NR at block 806. The measurement results may comprise any suitable information such as signal-to-interference and noise ratio (SINR), channel quality indicator, etc.

In an embodiment, the antenna array may comprise an active antenna system. In an embodiment, the network device comprises a base station of a wireless communication system.

Figure 9:
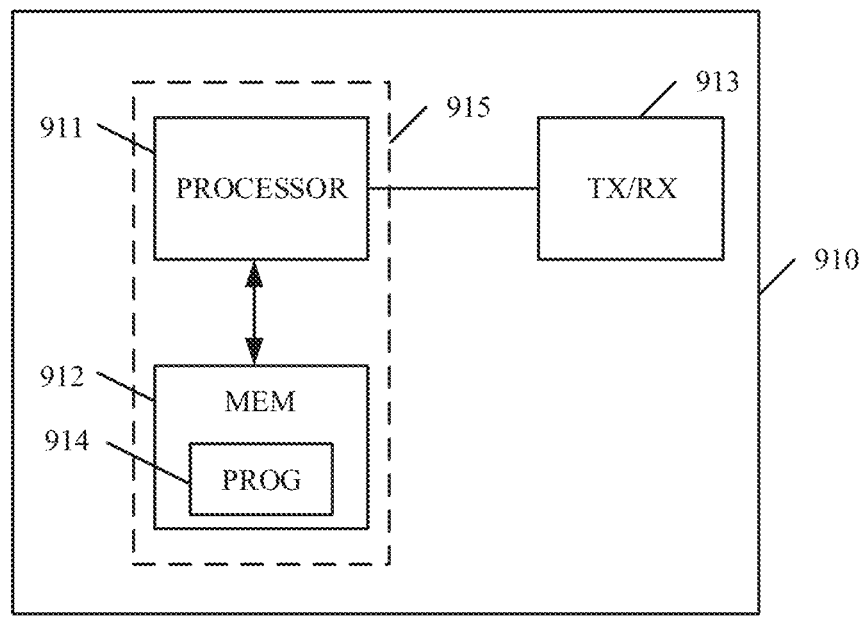
FIG. 9 illustrates a simplified block diagram of an apparatus according to an embodiment of the present disclosure.

FIG. 9 illustrates a simplified block diagram of an apparatus 910 that may be embodied in/as a network device according to an embodiment of the present disclosure.

The apparatus 910 may comprise at least one processor 911, such as a data processor (DP) and at least one memory (MEM) 912 coupled to the processor 911. The apparatus 910 may further comprise a transmitter TX and receiver RX 913 coupled to the processor 911. The MEM 912 stores a program (PROG) 914. The PROG 914 may include instructions that, when executed on the associated processor 911, enable the apparatus 910 to operate in accordance with the embodiments of the present disclosure, for example to perform any of the method 600. A combination of the at least one processor 911 and the at least one MEM 912 may form processing means 915 adapted to implement various embodiments of the present disclosure.

Figure 10:
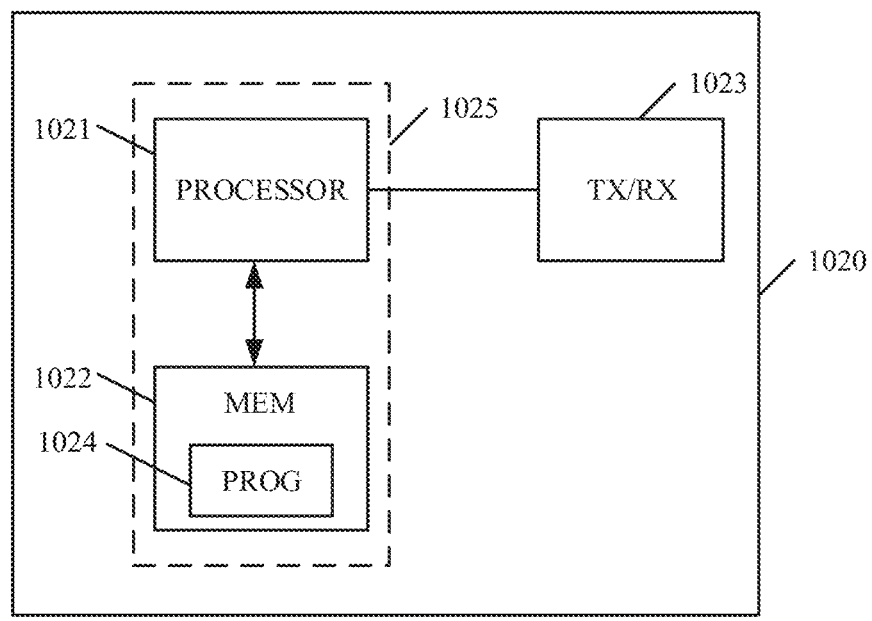
FIG. 10 illustrates a simplified block diagram of an apparatus according to another embodiment of the present disclosure.

FIG. 10 illustrates a simplified block diagram of an apparatus 1020 that may be embodied in/as a user equipment according to an embodiment of the present disclosure.

The apparatus 1020 may comprise at least one processor 1021, such as a data processor (DP) and at least one memory (MEM) 1022 coupled to the processor 1021. The apparatus 1020 may further comprise a transmitter TX and receiver RX 1023 coupled to the processor 1021. The MEM 1022 stores a program (PROG) 1024. The PROG 1024 may include instructions that, when executed on the associated processor 1021, enable the apparatus 1020 to operate in accordance with the embodiments of the present disclosure, for example to perform any of the method 800. A combination of the at least one processor 1021 and the at least one MEM 1022 may form processing means 1025 adapted to implement various embodiments of the present disclosure.

Various embodiments of the present disclosure may be implemented by computer program executable by one or more of the processors 911, 1021, software, firmware, hardware or in a combination thereof.

The MEMs 912 and 1022 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 911 and 1021 may be of any type suitable to the local technical environment, and may include one or more of general purpose computers, special purpose computers, microprocessors, digital signal processors DSPs and processors based on multicore processor architecture, as non-limiting examples.

Figure 11:
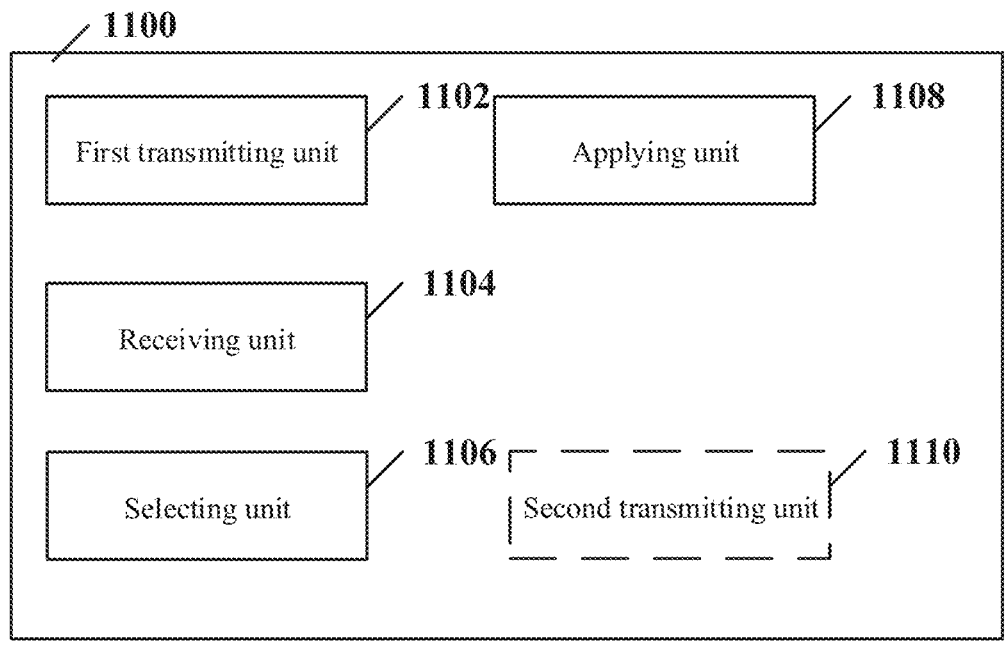
FIG. 11 illustrates a simplified block diagram of an apparatus according to another embodiment of the present disclosure.

Reference is now made to FIG. 11, which illustrates a schematic block diagram of an apparatus 1100 implemented as/at a network device. The apparatus 1100 is operable to carry out any of the exemplary method 600 described with reference to FIG. 6 and possibly any other processes or methods.

As shown in FIG. 11, the apparatus 1100 may comprise a first transmitting unit 1102 configured to transmit at least one reference signal to at least one user equipment by using at least one muting sequence of an antenna array; a receiving unit 1104 configured to receive measurement results of the at least one reference signal corresponding to the at least one muting sequence from the at least one user equipment; a selecting unit 1106 configured to select one muting sequence from the at least one muting sequence based on the measurement results; and an applying unit 1108 configured to apply the selected muting sequence of the antenna array.

In an embodiment, the apparatus 1100 may further comprise a second transmitting unit (optional) 1110 configured to transmit configuration information of the at least one reference signal to the at least one user equipment.

Figure 12:
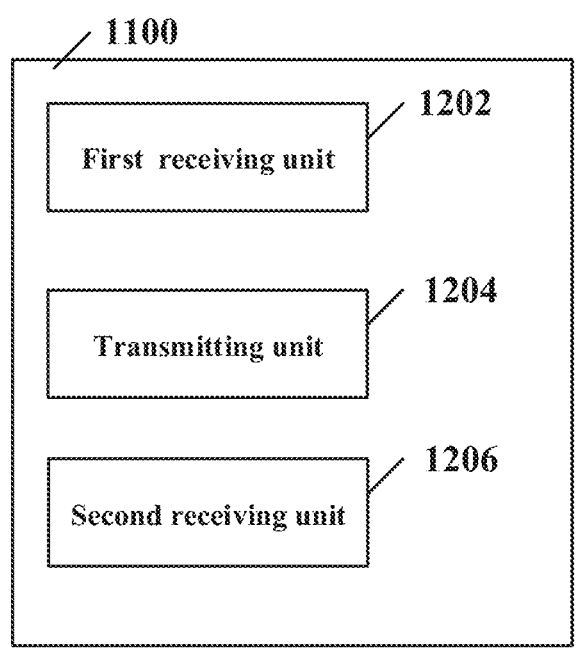
FIG. 12 illustrates a simplified block diagram of an apparatus according to another embodiment of the present disclosure.

Reference is now made to FIG. 12, which illustrates a schematic block diagram of an apparatus 1200 implemented as/at a UE. The apparatus 1200 is operable to carry out any of the exemplary method 800 described with reference to FIG. 8 and possibly any other processes or methods.

As shown in FIG. 12, the apparatus 1200 may comprise a first receiving unit 1202 configured to receive at least one reference signal transmitted from a network device by using different mute sequences of an antenna array; and a transmitting unit 1204 configured to transmit measurement results of the at least one reference signal to the network element.

In an embodiment, the apparatus 1100 may further comprise a second receiving unit (optional) 1206 configured to receive from the network device configuration information of the at least one reference signal.

Figure 13A:
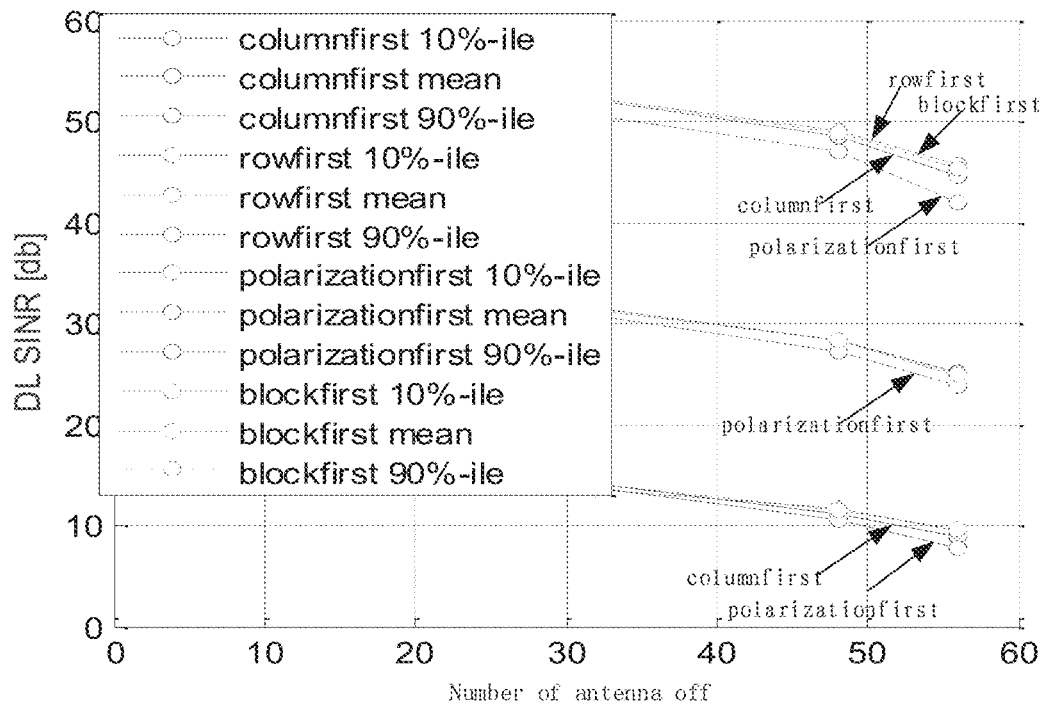
FIG. 13a shows DL SINR of antenna elements switching off approaches without inter-cell interference.
Figure 13B:
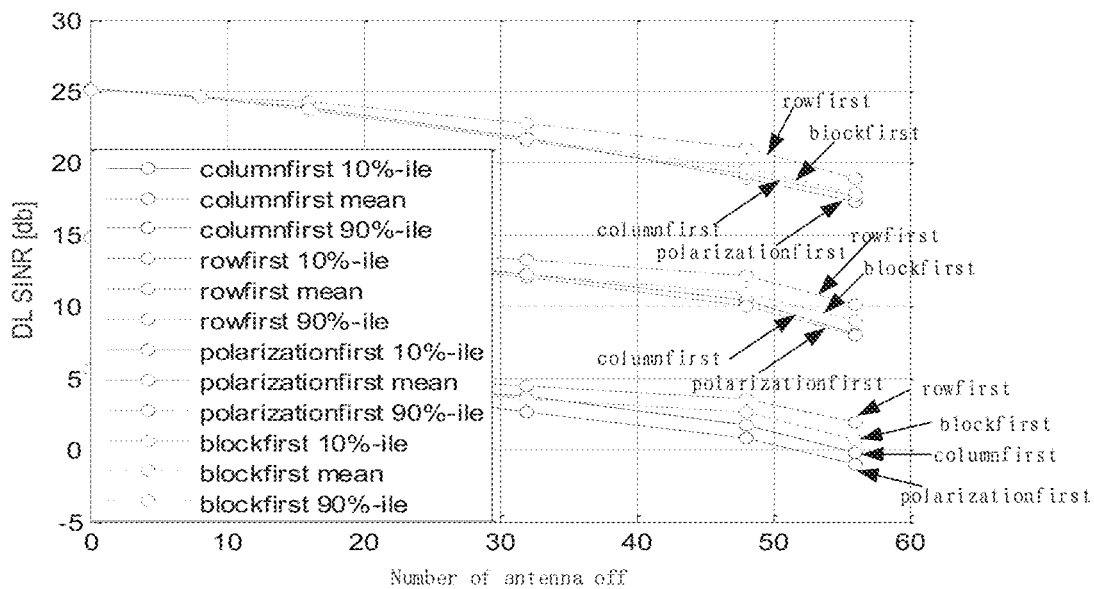
FIG. 13b shows DL SINR of antenna elements switching off approaches with inter-cell interference.

FIG. 13*a* shows DL SINR of antenna elements switching off approaches without inter-cell interference. FIG. 13*b* shows DL SINR of antenna elements switching off approaches with inter-cell interference. It can be seen that the sequence of the antenna elements switching off approaches giving a better SINR changes when considering inter-cell interference. In other word, the preferred MIMO sleep mode is different when inter-cell interference changes.

According to an aspect of the disclosure it is provided a computer program product being tangibly stored on a computer readable storage medium and including instructions which, when executed on at least one processor, cause the at least one processor to carry out any of the methods related to the network device as described above, such as the method 600.

According to an aspect of the disclosure it is provided a computer-readable storage medium storing instructions which when executed by at least one processor, cause the at least one processor to carry out carry out any of the methods related to the network device as described above, such as the method 600.

According to an aspect of the disclosure it is provided a computer program product being tangibly stored on a computer readable storage medium and including instructions which, when executed on at least one processor, cause the at least one processor to carry out any of the methods related to the UE as described above, such as the method 800.

According to an aspect of the disclosure it is provided a computer-readable storage medium storing instructions which when executed by at least one processor, cause the at least one processor to carry out carry out any of the methods related to the UE as described above, such as the method 800.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 14:
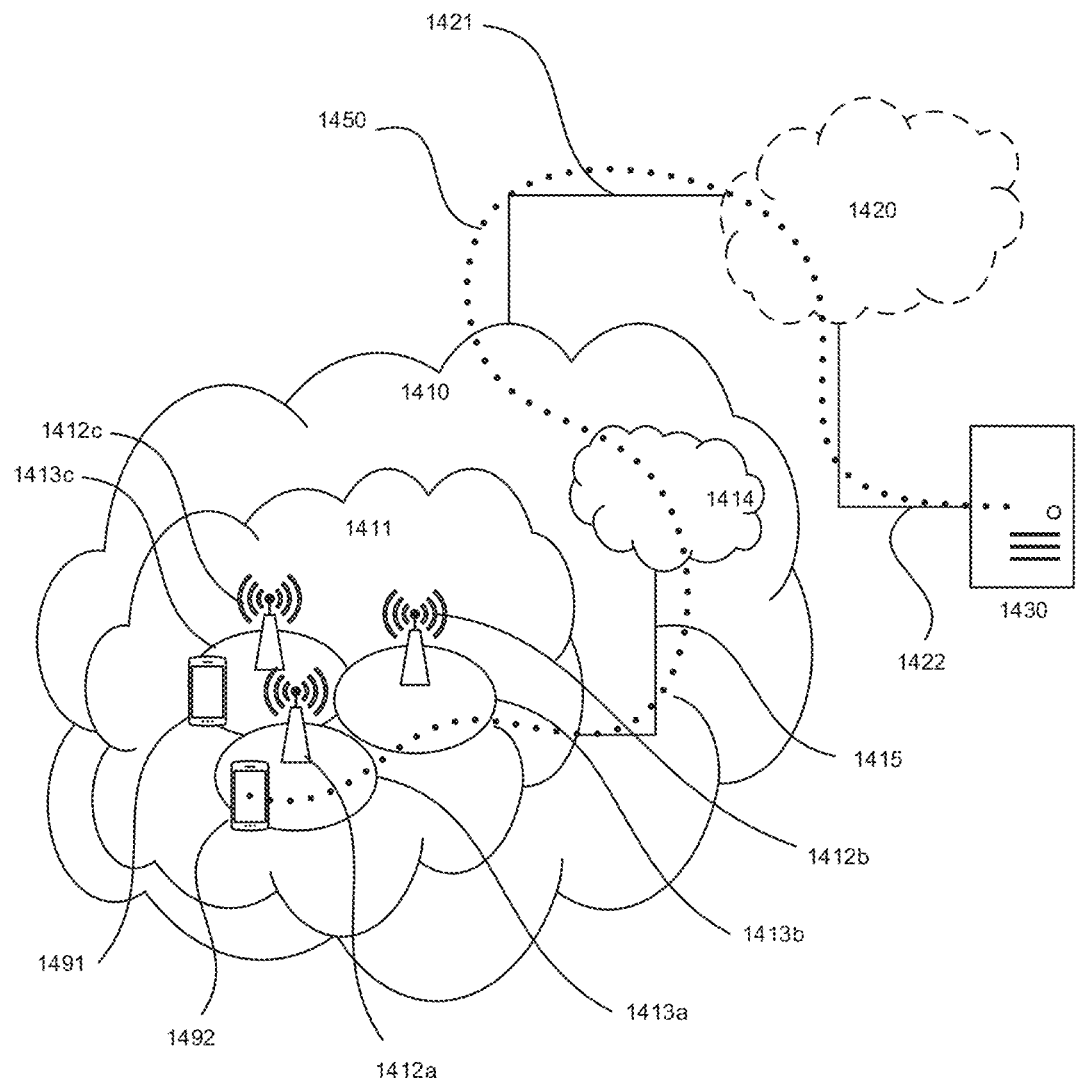
FIG. 14 is a block diagram illustrating a telecommunication network connected via an intermediate network to a host computer in accordance with some embodiments of the present disclosure.

FIG. 14 is a block diagram illustrating a telecommunication network connected via an intermediate network to a host computer in accordance with some embodiments of the present disclosure.

With reference to FIG. 14, in accordance with an embodiment, a communication system includes a telecommunication network 1410, such as a 3GPP-type cellular network, which comprises an access network 1411, such as a radio access network, and a core network 1414. The access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to the core network 1414 over a wired or wireless connection 1415. A first UE 1491 located in a coverage area 1413c is configured to wirelessly connect to, or be paged by, the corresponding base station 1412c. A second UE 1492 in a coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

The telecommunication network 1410 is itself connected to a host computer 1430, which may be embodied in the hardware and/or software of a standalone server, a cloud-implemented server, a distributed server or as processing resources in a server farm. The host computer 1430 may be under the ownership or control of a service provider, or may be operated by the service provider or on behalf of the service provider. Connections 1421 and 1422 between the telecommunication network 1410 and the host computer 1430 may extend directly from the core network 1414 to the host computer 1430 or may go via an optional intermediate network 1420. An intermediate network 1420 may be one of, or a combination of more than one of, a public, private or hosted network; the intermediate network 1420, if any, may be a backbone network or the Internet; in particular, the intermediate network 1420 may comprise two or more sub-networks (not shown).

The communication system of FIG. 14 as a whole enables connectivity between the connected UEs 1491, 1492 and the host computer 1430. The connectivity may be described as an over-the-top (OTT) connection 1450. The host computer 1430 and the connected UEs 1491, 1492 are configured to communicate data and/or signaling via the OTT connection 1450, using the access network 1411, the core network 1414, any intermediate network 1420 and possible further infrastructure (not shown) as intermediaries. The OTT connection 1450 may be transparent in the sense that the participating communication devices through which the OTT connection 1450 passes are unaware of routing of uplink and downlink communications. For example, the base station 1412 may not or need not be informed about the past routing of an incoming downlink communication with data originating from the host computer 1430 to be forwarded (e.g., handed over) to a connected UE 1491. Similarly, the base station 1412 need not be aware of the future routing of an outgoing uplink communication originating from the UE 1491 towards the host computer 1430.

Figure 15:
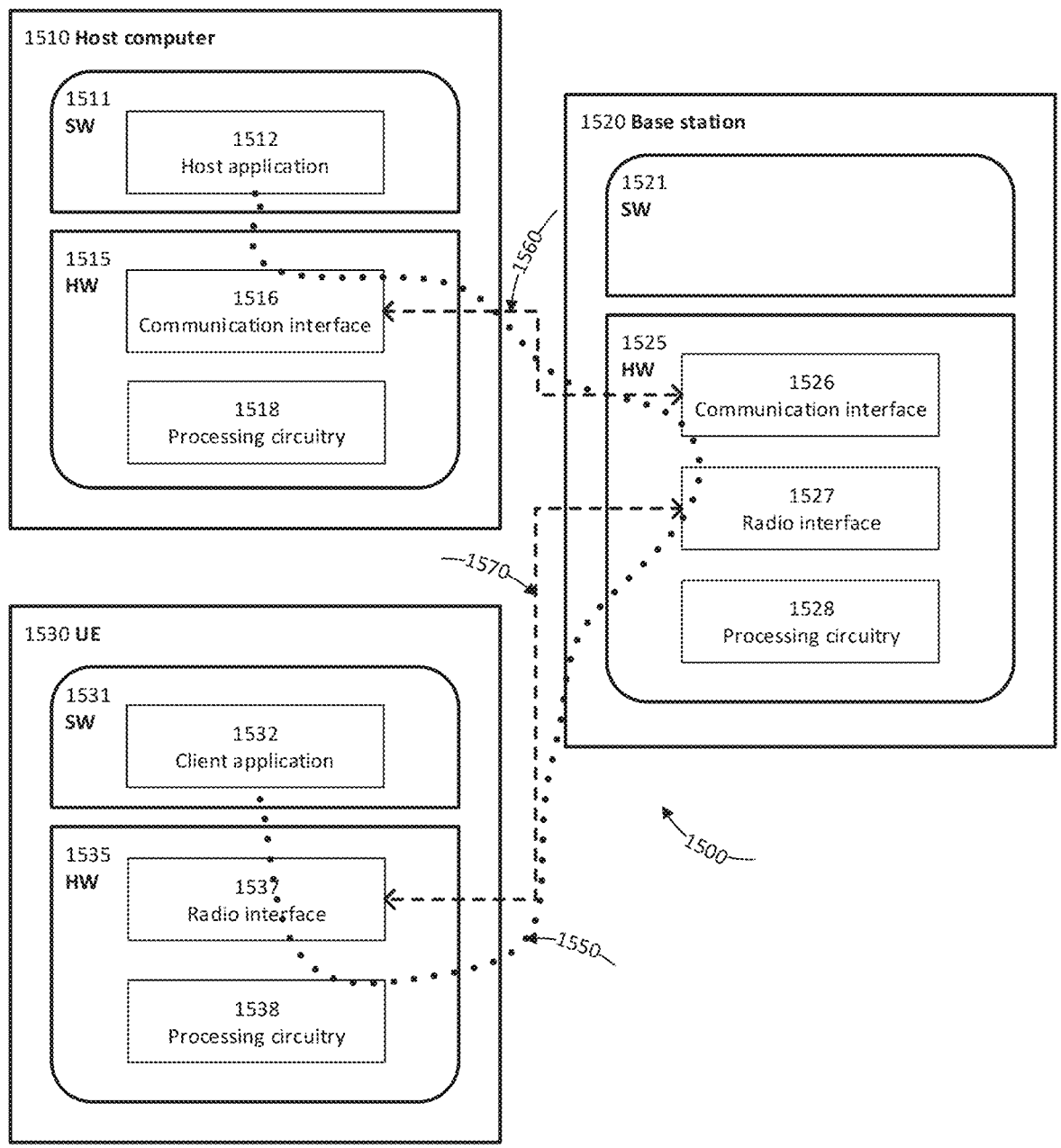
FIG. 15 is a block diagram illustrating a host computer communicating via a base station with a UE over a partially wireless connection in accordance with some embodiments of the present disclosure.

FIG. 15 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 15. In a communication system 1500, a host computer 1510 comprises hardware 1515 including a communication interface 1516 configured to set up and maintain a wired or wireless connection with an interface of a different communication device of the communication system 1500. The host computer 1510 further comprises a processing circuitry 1518, which may have storage and/or processing capabilities. In particular, the processing circuitry 1518 may comprise one or more programmable processors, application-specific integrated circuits, field programmable gate arrays or combinations of these (not shown) adapted to execute instructions. The host computer 1510 further comprises software 1511, which is stored in or accessible by the host computer 1510 and executable by the processing circuitry 1518. The software 1511 includes a host application 1512. The host application 1512 may be operable to provide a service to a remote user, such as UE 1530 connecting via an OTT connection 1550 terminating at the UE 1530 and the host computer 1510. In providing the service to the remote user, the host application 1512 may provide user data which is transmitted using the OTT connection 1550.

The communication system 1500 further includes a base station 1520 provided in a telecommunication system and comprising hardware 1525 enabling it to communicate with the host computer 1510 and with the UE 1530. The hardware 1525 may include a communication interface 1526 for setting up and maintaining a wired or wireless connection with an interface of a different communication device of the communication system 1500, as well as a radio interface 1527 for setting up and maintaining at least a wireless connection 1570 with the UE 1530 located in a coverage area (not shown in FIG. 15) served by the base station 1520. The communication interface 1526 may be configured to facilitate a connection 1560 to the host computer 1510. The connection 1560 may be direct or it may pass through a core network (not shown in FIG. 15) of the telecommunication system and/or through one or more intermediate networks outside the telecommunication system. In the embodiment shown, the hardware 1525 of the base station 1520 further includes a processing circuitry 1528, which may comprise one or more programmable processors, application-specific integrated circuits, field programmable gate arrays or combinations of these (not shown) adapted to execute instructions. The base station 1520 further has software 1521 stored internally or accessible via an external connection.

The communication system 1500 further includes the UE 1530 already referred to. Its hardware 1535 may include a radio interface 1537 configured to set up and maintain a wireless connection 1570 with a base station serving a coverage area in which the UE 1530 is currently located. The hardware 1535 of the UE 1530 further includes a processing circuitry 1538, which may comprise one or more programmable processors, application-specific integrated circuits, field programmable gate arrays or combinations of these (not shown) adapted to execute instructions. The UE 1530 further comprises software 1531, which is stored in or accessible by the UE 1530 and executable by the processing circuitry 1538. The software 1531 includes a client application 1532. The client application 1532 may be operable to provide a service to a human or non-human user via the UE 1530, with the support of the host computer 1510. In the host computer 1510, an executing host application 1512 may communicate with the executing client application 1532 via the OTT connection 1550 terminating at the UE 1530 and the host computer 1510. In providing the service to the user, the client application 1532 may receive request data from the host application 1512 and provide user data in response to the request data. The OTT connection 1550 may transfer both the request data and the user data. The client application 1532 may interact with the user to generate the user data that it provides.

It is noted that the host computer 1510, the base station 1520 and the UE 1530 illustrated in FIG. 15 may be similar or identical to the host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, the OTT connection 1550 has been drawn abstractly to illustrate the communication between the host computer 1510 and the UE 1530 via the base station 1520, without explicit reference to any intermediary devices and the precise routing of messages via these devices. Network infrastructure may determine the routing, which it may be configured to hide from the UE 1530 or from the service provider operating the host computer 1510, or both. While the OTT connection 1550 is active, the network infrastructure may further take decisions by which it dynamically changes the routing (e.g., on the basis of load balancing consideration or reconfiguration of the network).

Wireless connection 1570 between the UE 1530 and the base station 1520 is in accordance with the teachings of the embodiments described throughout this disclosure. One or more of the various embodiments improve the performance of OTT services provided to the UE 1530 using the OTT connection 1550, in which the wireless connection 1570 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1550 between the host computer 1510 and the UE 1530, in response to variations in the measurement results. The measurement procedure and/or the network functionality for reconfiguring the OTT connection 1550 may be implemented in software 1511 and hardware 1515 of the host computer 1510 or in software 1531 and hardware 1535 of the UE 1530, or both. In embodiments, sensors (not shown) may be deployed in or in association with communication devices through which the OTT connection 1550 passes; the sensors may participate in the measurement procedure by supplying values of the monitored quantities exemplified above, or supplying values of other physical quantities from which the software 1511, 1531 may compute or estimate the monitored quantities. The reconfiguring of the OTT connection 1550 may include message format, retransmission settings, preferred routing etc.; the reconfiguring need not affect the base station 1520, and it may be unknown or imperceptible to the base station 1520. Such procedures and functionalities may be known and practiced in the art. In certain embodiments, measurements may involve proprietary UE signaling facilitating the host computer 1510's measurements of throughput, propagation times, latency and the like. The measurements may be implemented in that the software 1511 and 1531 causes messages to be transmitted, in particular empty or 'dummy' messages, using the OTT connection 1550 while it monitors propagation times, errors etc.

Figure 16:
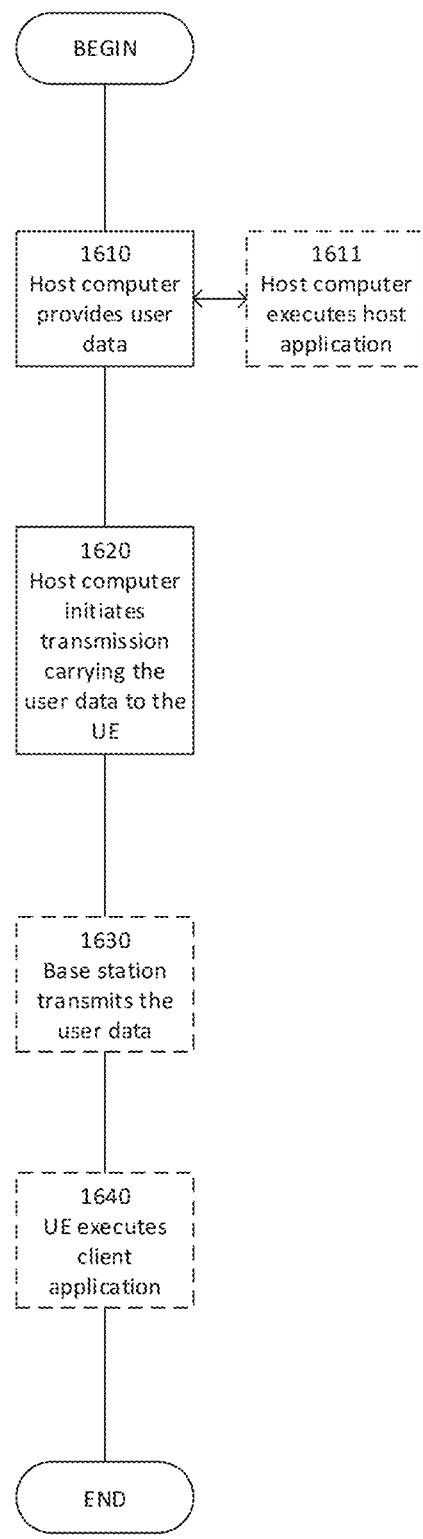
FIG. 16 is a flowchart illustrating a method implemented in a communication system, in accordance with an embodiment of the present disclosure.

FIG. 16 is a flowchart illustrating a method implemented in a communication system, in accordance with an embodiment. The communication system includes a host computer, a base station and a UE which may be those described with reference to FIG. 14 and FIG. 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
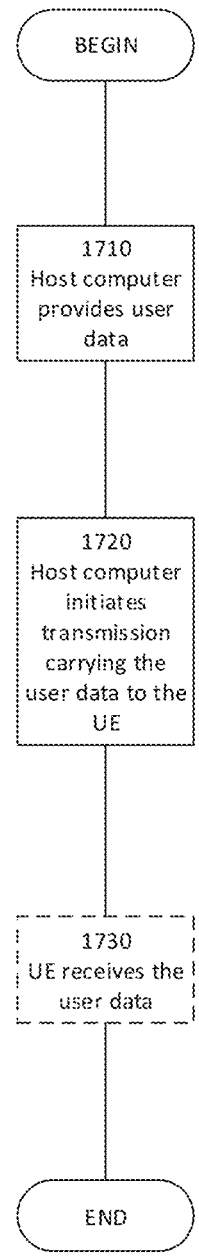
FIG. 17 is a flowchart illustrating a method implemented in a communication system, in accordance with an embodiment of the present disclosure.

FIG. 17 is a flowchart illustrating a method implemented in a communication system, in accordance with an embodiment. The communication system includes a host computer, a base station and a UE which may be those described with reference to FIG. 14 and FIG. 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
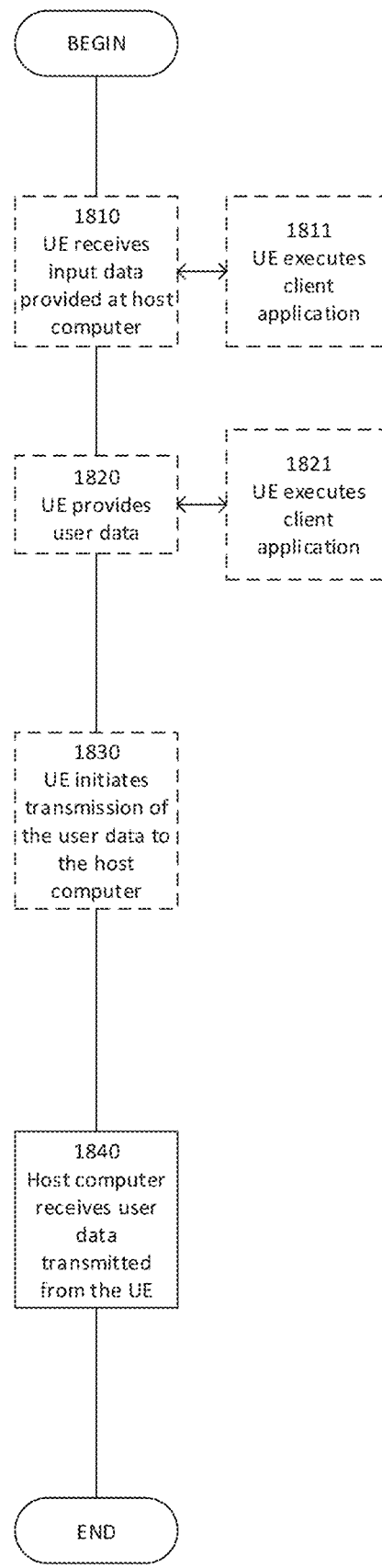
FIG. 18 is a flowchart illustrating a method implemented in a communication system, in accordance with an embodiment of the present disclosure.

FIG. 18 is a flowchart illustrating a method implemented in a communication system, in accordance with an embodiment. The communication system includes a host computer, a base station and a UE which may be those described with reference to FIG. 14 and FIG. 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional)

of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
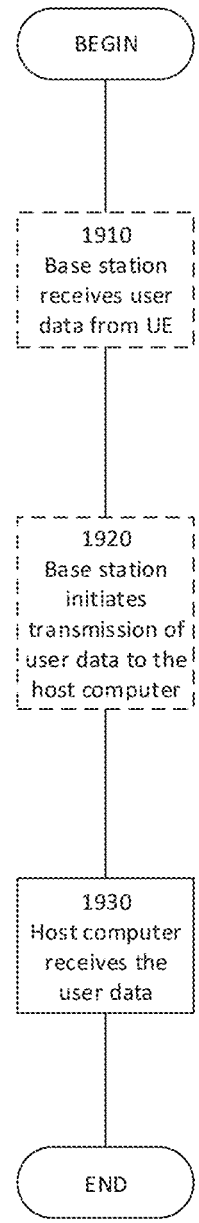
FIG. 19 is a flowchart illustrating a method implemented in a communication system, in accordance with an embodiment of the present disclosure.

FIG. 19 is a flowchart illustrating a method implemented in a communication system, in accordance with an embodiment. The communication system includes a host computer, a base station and a UE which may be those described with reference to FIG. 14 and FIG. 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method of operating a network node, the method comprising:
   transmitting at least one reference signal to at least one user equipment using a plurality of different muting sequences of an antenna array;
   receiving an indication of measurement results from the at least one user equipment, the measurement results being associated with the at least one reference signal corresponding to the plurality of different muting sequences;
   selecting a muting sequence from the plurality of different muting sequences based on the measurement results; and
   applying the muting sequence of the antenna array,
   wherein the measurement results comprise at least one statistical value,
   wherein the measurement results comprise a first statistical value of the plurality of different muting sequences and a second statistical value of the plurality of different muting sequences, and
   wherein a difference between the first statistical value and the second statistical value is smaller than a predefined threshold.

2. The method of claim 1, wherein selecting the muting sequence from the plurality of different muting sequences based on the measurement results comprises selecting the muting sequence from plurality of different muting sequences based on the measurement results and at least one of:
   a power saving result corresponding to the plurality different of muting sequences;

a coverage and system capacity corresponding to the plurality of different muting sequences.

3. The method of claim 2, wherein the measurement results comprise a signal-to-interference and noise ratio ("SINR"), and
wherein the coverage and system capacity are derived from the SINR.

4. The method of claim 1, further comprising:
transmitting configuration information associated with the at least one reference signal to the at least one user equipment.

5. The method of claim 4, wherein the configuration information is associated with at least one of:
a channel state information-interference measurement ("CSI-IM"); and
a channel state information-reference signal ("CSI-RS").

6. The method of claim 1, wherein the plurality of different muting sequences comprises at least one of:
a row-wise muting sequence;
a column-wise muting sequence; and
a block-wise muting sequence.

7. The method of claim 1, wherein the at least one statistical value comprises a percentile or mean of measurements associated with the at least one reference signal.

8. The method of claim 1,
wherein selecting the muting sequence from the plurality of different muting sequences comprises selecting the first muting sequence based on the first muting sequence saving more power than the second muting sequence.

9. The method of claim 1, wherein unmuted antenna elements of the antenna array form a connectivity pattern.

10. The method of claim 1, wherein the antenna array comprises an active antenna system.

11. The method of claim 1, wherein the network node comprises a base station of a wireless communication system.

12. A method of operating a user equipment, the method comprising:
receiving at least one-reference signal from a network node using a plurality of different muting sequences of an antenna array;
determining measurement results associated with the at least one reference signal; and
transmitting an indication of the measurement results to the network node,
wherein the measurement results comprise a first statistical value of the plurality of different muting sequences and a second statistical value of the plurality of different muting sequences, and
wherein a difference between the first statistical value and the second statistical value is smaller than a predefined threshold.

13. The method of claim 12, wherein the measurement results comprise a signal-to-interference and noise ratio ("SINR").

14. The method of claim 12, further comprising:
receiving configuration information associated with the at least one reference signal from the network node, the configuration information being associated with at least one of:
a channel state information-interference measurement ("CSI-IM"); and
a channel state information-reference signal ("CSI-RS").

15. The method of claim 12, wherein the plurality of different muting sequences comprise at least one of:
a row-wise muting sequence;
a column-wise muting sequence; and
a block-wise muting sequence,
wherein unmuted antenna elements of the antenna array form a connectivity pattern,
wherein the antenna array comprises an active antenna system, and
wherein the network node comprises a base station of a wireless communication system.

16. An apparatus implemented at a user equipment, the apparatus comprising:
a processor; and
memory coupled to the processor and including instructions executable by the processor to cause the apparatus to perform operations comprising:
receiving at least one-reference signal from a network node using a plurality of different muting sequences of an antenna array;
determining measurement results associated with the at least one reference signal; and
transmitting an indication of the measurement results to the network node,
wherein the measurement results comprise a first statistical value of the plurality of different muting sequences and a second statistical value of the plurality of different muting sequences, and
wherein a difference between the first statistical value and the second statistical value is smaller than a predefined threshold.

17. The apparatus of claim 16, wherein the measurement results comprise a signal-to-interference and noise ratio ("SINR").

18. The apparatus of claim 16, further comprising:
receiving configuration information associated with the at least one reference signal from the network node, the configuration information being associated with at least one of:
a channel state information-interference measurement ("CSI-IM"); and
a channel state information-reference signal ("CSI-RS").

19. The apparatus of claim 16, wherein the plurality of different muting sequences comprise at least one of:
a row-wise muting sequence;
a column-wise muting sequence; and
a block-wise muting sequence,
wherein unmuted antenna elements of the antenna array form a connectivity pattern,
wherein the antenna array comprises an active antenna system, and
wherein the network node comprises a base station of a wireless communication system.

* * * * *